United States Patent
Lefeber et al.

(10) Patent No.: US 6,668,059 B1
(45) Date of Patent: Dec. 23, 2003

(54) TELEPHONE TUNING AND SIGNALING SYSTEM

(75) Inventors: Gideon Lefeber, Haifa (IL); Reuven Goldblat, Kiryat Yam (IL)

(73) Assignee: Internet2Anywhere, Ltd., Yokneam (IL)

( * ) Notice: Subject to any disclaimer, the term of this patent is extended or adjusted under 35 U.S.C. 154(b) by 0 days.

(21) Appl. No.: 09/550,587

(22) Filed: Apr. 17, 2000

(30) Foreign Application Priority Data

Apr. 16, 2000 (IL) ................................. 135670

(51) Int. Cl.$^7$ ................................. H04M 1/00

(52) U.S. Cl. .............. 379/372; 379/207.08; 379/207.09

(58) Field of Search ............................ 379/372, 373.01, 379/373.02, 373.03, 373.04, 377, 376.02, 29.06, 82, 88.03, 207.08, 207.09, 207.1, 207.16, 382

(56) References Cited

U.S. PATENT DOCUMENTS

| | | | |
|---|---|---|---|
| 4,969,054 A | 11/1990 | Tsugei et al. | |
| 4,969,186 A | 11/1990 | Sayre, II | |
| 5,138,653 A | 8/1992 | Le Clercq | |
| 5,148,473 A | 9/1992 | Freeland et al. | |
| 5,166,973 A | 11/1992 | Hoff | |
| 5,293,250 A | 3/1994 | Okumura et al. | |
| 5,398,280 A | 3/1995 | MacConnell | |
| 5,402,466 A | 3/1995 | Delahanty | |
| 5,402,467 A | 3/1995 | Watanabe | |
| 5,418,835 A | 5/1995 | Frohman et al. | |
| 5,537,657 A | * 7/1996 | King, III | ................... 379/179 |
| 5,541,976 A | 7/1996 | Ghisler | |
| 5,561,703 A | 10/1996 | Arledge et al. | |
| 5,590,178 A | 12/1996 | Murakami et al. | |
| 5,604,788 A | 2/1997 | Tett | |
| 5,608,782 A | 3/1997 | Carlsen et al. | |
| 5,611,055 A | 3/1997 | Krishan et al. | |
| 5,661,781 A | 8/1997 | DeJager | |
| 5,664,009 A | 9/1997 | Hurst et al. | |
| 5,689,825 A | 11/1997 | Averbuch et al. | |
| 5,715,308 A | * 2/1998 | Shankarappa | ................ 379/373 |
| 5,742,668 A | 4/1998 | Pepe et al. | |
| 5,742,905 A | 4/1998 | Pepe et al. | |
| 5,754,628 A | 5/1998 | Bossi et al. | |
| 5,761,415 A | 6/1998 | Joseph et al. | |
| 5,781,857 A | 7/1998 | Hwang et al. | |
| 5,787,159 A | 7/1998 | Hamilton et al. | |
| 5,790,649 A | 8/1998 | Hiroshige | |
| 5,790,974 A | 8/1998 | Tognazzini | |
| 5,797,089 A | 8/1998 | Nguyen | |
| 5,802,166 A | 9/1998 | Garcia et al. | |
| 5,802,460 A | 9/1998 | Parvulescu et al. | |
| 5,805,587 A | 9/1998 | Norris et al. | |
| 5,825,814 A | 10/1998 | Detwiler et al. | |
| 5,828,949 A | 10/1998 | Silver et al. | |
| 5,832,218 A | 11/1998 | Gibbs et al. | |
| 5,841,850 A | 11/1998 | Fan | |
| 5,844,969 A | 12/1998 | Goldman et al. | |
| 5,850,519 A | 12/1998 | Vazana | |
| 5,884,190 A | 3/1999 | Lintula et al. | |
| 5,889,839 A | 3/1999 | Beyda et al. | |

(List continued on next page.)

FOREIGN PATENT DOCUMENTS

| | | |
|---|---|---|
| EP | 0798899 | 1/1997 |
| WO | 90/14726 | 11/1990 |
| WO | 97/27546 | 7/1997 |
| WO | 98/32271 | 7/1998 |

*Primary Examiner*—Rexford Barnie
(74) *Attorney, Agent, or Firm*—Hogan & Hartson LLP

(57) ABSTRACT

A method for determining the time required for a server to effect a telephone ring signal at a client computer, the method including tracking elapsed time concurrently at the server and the client computer, initiating a telephone call from the sever to the client computer after a specified time period has elapsed, detecting at least one telephone ring signal at the client computer, recording the time at which the telephone ring signal is detected at the client computer, and transmitting the recorded time to the server.

6 Claims, 3 Drawing Sheets

U.S. PATENT DOCUMENTS

| | | |
|---|---|---|
| 5,905,777 A | 5/1999 | Foladare et al. |
| 5,917,887 A | 6/1999 | Fesler et al. |
| 5,933,478 A | 8/1999 | Ozaki et al. |
| 5,937,161 A | 8/1999 | Mulligan et al. |
| 5,944,786 A | 8/1999 | Quinn |
| 5,956,486 A | 9/1999 | Hickman et al. |
| 5,960,062 A * | 9/1999 | Chang et al. .............. 379/67.1 |
| 5,963,626 A | 10/1999 | Nabkel |
| 5,964,833 A | 10/1999 | Kikinis |
| 5,970,122 A | 10/1999 | LaPorta et al. |
| 5,982,281 A | 11/1999 | Layson, Jr. |
| 5,983,117 A | 11/1999 | Sandler et al. |
| 5,987,508 A | 11/1999 | Agraharam et al. |
| 6,002,945 A | 12/1999 | McDuffee |
| 6,005,845 A | 12/1999 | Svennesson et al. |
| 6,006,098 A | 12/1999 | Rathnasabapathy et al. |
| 6,011,975 A | 1/2000 | Emery et al. |
| 6,014,429 A | 1/2000 | LaPorta et al. |
| 6,047,047 A | 4/2000 | Aldridge et al. |
| 6,061,718 A | 5/2000 | Nelson |
| 6,064,317 A | 5/2000 | Aoki |
| 6,067,561 A | 5/2000 | Dillon |
| 6,069,890 A | 5/2000 | White et al. |
| 6,076,099 A | 6/2000 | Chen et al. |
| 6,078,819 A | 6/2000 | Ciccone et al. |
| 6,078,820 A | 6/2000 | Wells et al. |
| 6,085,097 A | 7/2000 | Savery et al. |
| 6,094,681 A | 7/2000 | Shaffer et al. |
| 6,101,396 A | 8/2000 | Chavez, Jr. |

\* cited by examiner

TELEPHONE TUNING AND SIGNALING SYSTEM

FIELD OF THE INVENTION

The present invention relates to telephone signaling systems in general, and more particularly to methods and apparatus for controlling telephone rings.

BACKGROUND OF THE INVENTION

It is curtly not possible for a telephone caller to know prior to placing a telephone call to another party the number of rings and the delay between rings that will occur at the called party's telephone. This is due mainly to the differences between telephone systems, even within a single country or area code. Furthermore, different providers of PABX services utilize different ring generators, and those PABXs that have computer interfaces often take different routes to the various destination computers, causing rings and delays at a particular client computer to vary from those of another client computer, even within the same PABX system.

SUMMARY OF THE INVENTION

The present invention seeks to provide an automatic tuning process whereby a telephone caller may know prior to placing a telephone call to another party the number of rings and the delay between rings that will occur at the called party's telephone. The invention is preferably implemented using a computer, such as a personal computer or a wireless computer device such as a World-Wide-Web enabled device, that is adapted to place a telephone call via a land-based or wireless telephone network. The called party's computer or wireless device then provides ring and delay information to the calling computer via a computer network. The ring and delay information may then be used by the calling computer to cause a predetermined number of telephone ring signals and ring separation delays to occur at a called computer or web-enabled wireless device in order to convey information thereby.

There is thus provided in accordance with a preferred embodiment of the present invention a method for determining the time required for a server to effect a telephone ring signal at a client computer, the method including tracking elapsed time concurrently at the server and the client computer, initiating a telephone call from the server to the client computer after a specified time period has elapsed, detecting at least one telephone ring signal at the client computer, recording the time at which the telephone ring signal is detected at the client computer, and transmitting the recorded time to the server.

Further in accordance with a preferred embodiment of the present invention the method further includes transmitting an indication of the specified time period to the client computer.

Still further in accordance with a preferred embodiment of the present invention any of the transmitting steps includes transmitting via a network.

Additionally in accordance with a preferred embodiment of the present invention the method further includes maintaining the call for a predetermined length of time sufficient for three ring signals to be detected at the client computer.

Moreover in accordance with a preferred embodiment of the present invention the method further includes discontinuing the call subsequent to the detecting step.

There is also provided in accordance with a preferred embodiment of the present invention a method for conveying information to a computer, the method including notifying the computer of at least one ring-and-delay combination and the information that the combination represents, initiating a telephone call to the computer, effecting the ring-and-delay combination at the computer via the telephone call, and detecting the ring-and-delay combination at the computer, thereby conveying the information to the computer.

Further in accordance with a preferred embodiment of the present invention the method further includes varying the ring-and-delay combination in accordance with an algorithm known in advance to the computer.

There is additionally in accordance with a preferred embodiment of the present invention a method for conveying information to a computer, the method including determining the time required for a server to effect a telephone ring signal at the computer by tracking elapsed time concurrently at the server and the computer, initiating a telephone call from the server to the computer after a specified time period has elapsed, detecting at least one telephone ring signal at the computer, recording the time at which the telephone ring signal is detected at the computer, and transmitting the recorded time to the server, notifying the computer of at least one ring-and-delay combination and the information that the combination represents, initiating a telephone call to the computer, effecting the ring-and-delay combination using the recorded time at the computer via the telephone call, and detecting the ring-and-delay combination at the computer, thereby conveying the information to the computer.

It is appreciated throughout the specification and claims that the term "automatic tuning process" refers to a procedure for determining the time required for a computer server to effect one or more telephone ring signals at a client computer, that the term "signaling operation" refers to a procedure for causing a predetermined number of telephone ring signals and ring separation delays to occur at a client computer, that the term "computes" refers to any device incorporating a central processing unit, such as, but not limited to, a personal computer, a notebook computer, and a cellular telephone, and that the term "network" refers to a wired or wireless computer network or other telecommunications network capable of conveying electronic transmissions between computers.

BRIEF DESCRIPTION OF THE DRAWINGS

The present invention will be understood and appreciated more fully from the following detailed description taken in conjunction with the appended drawings, in which.

DETAILED DESCRIPTION OF PREFERRED EMBODIMENTS

Figure 1:
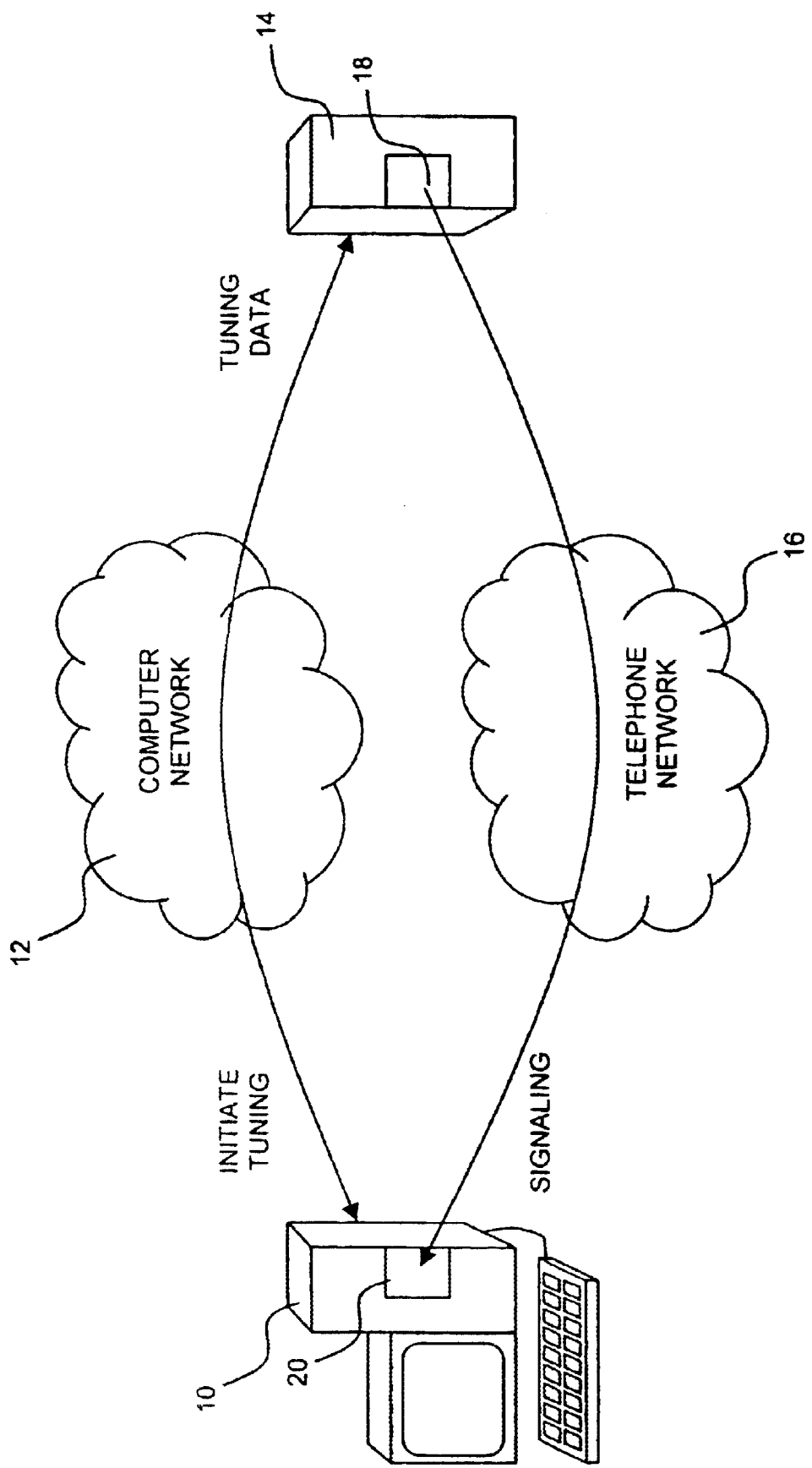
FIG. 1 is a simplified conceptual illustration of a system for controlling telephone rings, constructed and operative in accordance with a preferred embodiment of the present invention.

Reference is now made to FIG. 1, which is a simplified conceptual illustration of a system for controlling telephone rings, constructed and operative in accordance with a preferred embodiment of the present invention. In the system of FIG. 1 a client computer 10, which may be any known computer or web-enabled wireless device, is shown in telephonic communication with a network 12, typically the Internet, using any conventional means. Client 10 is adapted to send transmissions to a server 14, which may be any known server computer, via network 12 using any suitable network communications protocol, and likewise to receive transmissions from server 14. Server 14 is adapted to place a telephone call via a land-based or wireless telephone network 16 using dialing apparatus 18 to client 10 in response to receiving a transmission from client 10. Dialing apparatus 18 may be any known dialing means controllable by a server, such as a standard modem. Client 10 is adapted to detect the call using call detection apparatus 20. Detection apparatus 20 may be any known call detection means for interfacing with client 10, and is adapted to identify telephone rings and provide notifications of ring events to client 10.

Figure 2:
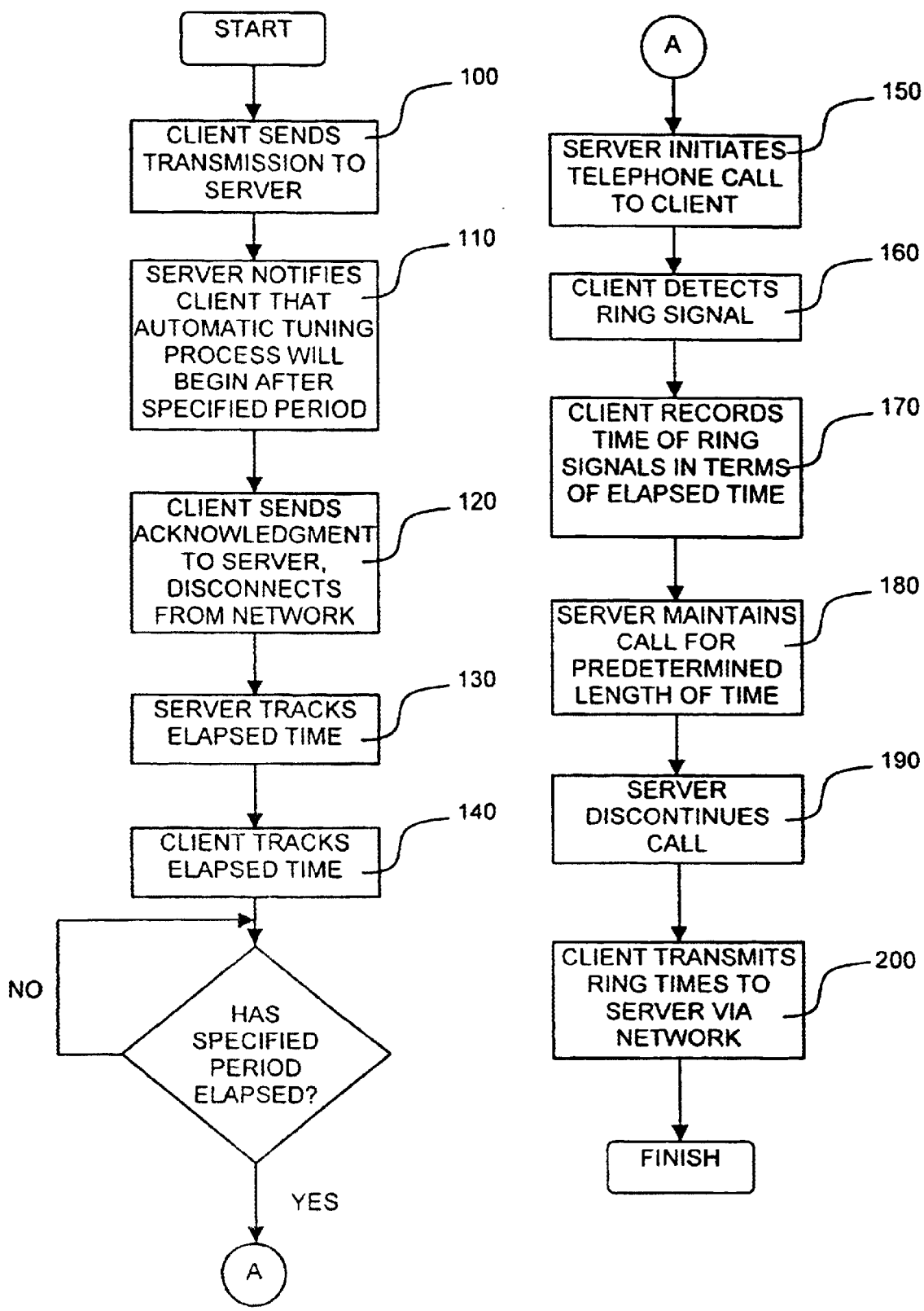
FIG. 2 is a simplified flowchart illustration of an exemplary automatic tuning process of the system of FIG. 1, operative in accordance with a preferred embodiment of the present invention.

Reference is now made to FIG. 2, which is a simplified flowchart illusion of an exemplary automatic tuning process of the system of FIG. 1 operative in accordance with a preferred embodiment of the present invention. In the method of FIG. 2 client 10 establishes a telephonic connection to network 12 and sends a transmission via network 12 to server 14 (step 100). The transmission may include information identifying client 10, including client 10's network address, or else client 10's network address may simply be included in the transmission header in accordance with standard network transmission protocols. Once server 14 identifies client 10 from the transmission, server 14 sends a transmission via network 12 to client 10 indicating that an automatic tuning process is about to commence (step 110). The transmission from server 14 may indicate to client 10 that the automatic tuning process will begin after a specified period of time elapses from the time of receipt of the transmission from server 14 by client 10. Alteratively, this period of time may be predefined in advance and known to both server 14 and client 10, and thus need not be conveyed by transmission. Client 10 then preferably acknowledges receipt of the transmission from server 14 and disconnects from network 12 (step 120). Server 14 begins tacking the elapsed time of the automatic tuning process from the time it sent its transmission to client 10, or alternatively from the time server 14 received client 10's acknowledgement (step 130). Client 10 likewise begins tracking the elapsed time of the automatic tuning process from the time it received server 14's transmission, or alternatively from the time client 10 sent its acknowledgement of receipt of server 14's transmission (step 140). Typically, both client 10 and server 14 track elapsed time by referring to an internal system clock in accordance with conventional techniques.

Once the specified period of time has elapsed, server 14 initiates a telephone call to client 10 via telephone network 16 using dialing apparatus 18 (step 150). Upon receipt of the call at call detection apparatus 20, detection apparatus 20 indicates to client 10 that a call has been received. Preferably, detection apparatus 20 notifies client 10 of events relating to the call using known telephony application programming interface (TAPI) protocols, with detection apparatus 20 sending client 10 an event message each time a ring signal is detected (step 160). Client 10 records the time of each ring signal event in terms of the current elapsed time from the start of the automatic tug process (step 170). Server 14 maintains the call for a predetermined length of time, preferably sufficient for three rings to be detected by detection apparatus 20 (step 180). Server 14 then instructs dialing apparatus 18 to discontinue the call to client 10 (step 190).

After waiting a predefined period of time in which no rings are detected, client 10 reestablishes a telephonic connection to network 12 and transmits to server 14 via network 12 the recorded time of one or more of the ring signal events in terms of the elapsed time from the start of the automatic tuning process (step 200). Typically, client 10 only transmits the recorded times of the first two ring events it encounters. Thus, for example, if $t_0$ is the time at which the automatic tuning process is to begin, the first ring event $t_1$ might be reported as $t_0+2$ seconds, while the second ring event $t_2$ might be reported as $t_0+6$ seconds, and the third at $t_0+10$ seconds. Alternatively, each ring event may be reported in terms of a time offset from the immediately-preceding ring event (e.g., $t_1$ $t_0+2$ seconds, $t_2=t_1+4$ seconds, etc.). In this manner, server 14 may know that a telephone call placed to client 10 at a time to for a duration of $t_0+6$ seconds will cause one complete ring to occur at client 10, that a call of a duration $<t_0+10$ seconds will cause a second complete ring to occur at client 10, and that a ring cycle from the start of one ring until the start of the next ring is 4 seconds.

It is appreciated that the method of FIG. 2 may be implemented periodically in order to obtain updated tuning information, this in accordance with a predetermined schedule or at the initiative of either client 10 or server 14.

Figure 3:
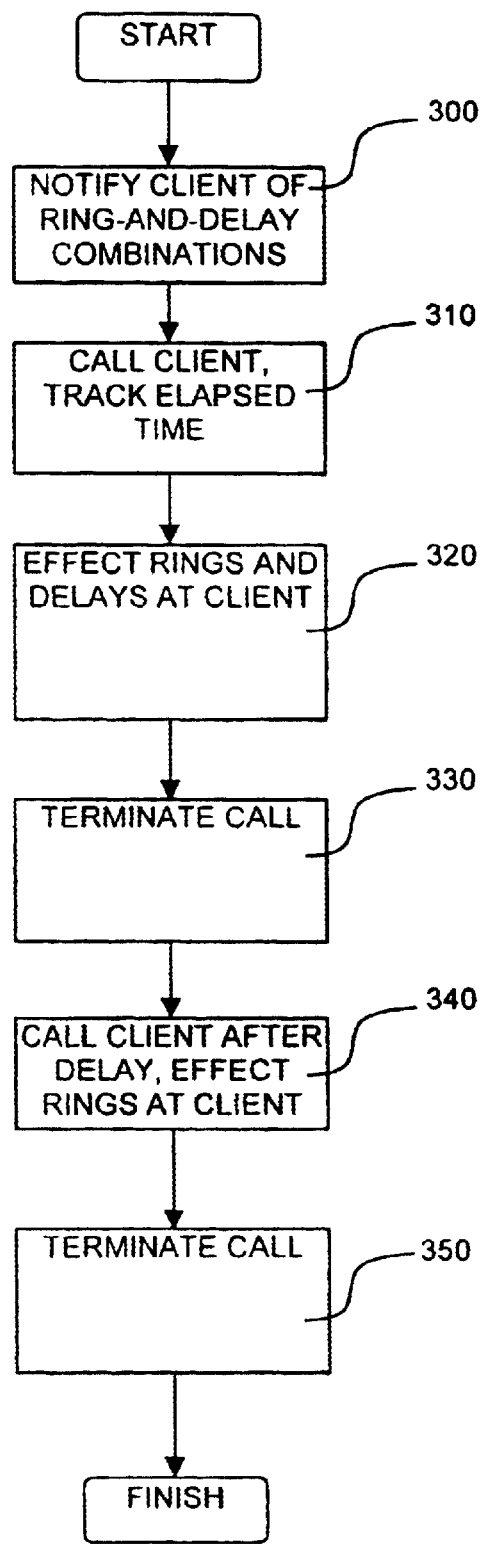
FIG. 3 is a simplified flowchart illustration of an exemplary signaling operation of the system of FIG. 1, operative in accordance with a preferred embodiment of the present invention.

Reference is now made to FIG. 3, which is a simplified flowchart illustration of an exemplary signaling operation of the system of FIG. 1, operative in accordance with a preferred embodiment of the present invention In the method of FIG. 3, server 14 uses ring signal timing data received from client 10 as part of an automatic tuning process to convey information to client 10. The signaling operation begins with server 14 notifying client 10, typically as part of a transmission via network 12, of one or more ring-and-delay combinations and the information that each particular ring and delay combination represents (step 300). For example, server 14 might indicate to client 10 that two rings followed by a delay of 45 seconds followed by one ring indicates that an email message has arrived at server 14 that is addressed to client 10. Thus, when server 14 wishes to signal client 10, it initiates a telephone call to client 10 at time to and begins tracking the elapsed time (step 310). The two rings are then effected at client 10 at times $t_0+2$ and $t_0+6$ (step 320), with the call being terminated prior to $t_0+10$ (step 330). Preferably, termination of a call should be sufficiently prior to the beginning of the next ring, such as by terminating the call at $t_0+(0.8=(ring\ cycle))$ or at another faction of the ring cycle. A second telephone call is then initiated at $t_0+45-2$ (since, in this example, a fist ring occurs two seconds after the initiation of the telephone call) (step 340) and terminated prior to $t_0+45+4$ (step 350), thus completing the two-rings-delay-one-ring signaling operation.

It is appreciated that the various ring-and-delay combinations need not be fixed, but rather may vary in the number of rings, the length of the delays, and the combination of rings and delays. Thus, the 45 second delay in the preceding example may be extended to 50 seconds in the next signaling operation and still convey the same information. In a variation of the preceding example server 14 might simulate the initial two-ring telephone call using two one-ring telephone calls separated by a delay of a few seconds. The variations may be transmitted to client 10 by server 14 or may be applied in accordance with an algorithm known in advance to both client 10 and server 14 and dependant on factors such as the date and time of the telephone call or other known pseudo-randomization factors.

It is appreciated that one or more steps of any of the methods described herein may be omitted or implemented in a different order than that shown while not departing from the spirit and scope of the invention.

While the methods and apparatus disclosed herein may or may not have been described with reference to specific hardware or software, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for determining the time required for a server to effect a telephone ring signal at a client computer, the method comprising:

tracking elapsed time concurrently at said server and said client computer;

initiating a telephone call from said server to said client computer after a specified time period has elapsed;

detecting at least one telephone ring signal at said client computer;

recording the time at which said telephone ring signal is detected at said client computer; and transmitting said recorded time to said server.

2. A method according to claim 1 and further comprising transmitting an indication of said specified time period to said client computer.

3. A method according to claim 1 wherein any of said transmitting steps comprises transmitting via a network.

4. A method according to claim 1 and further comprising maintaining said call for a predetermined length of time sufficient for three ring signals to be detected at said client computer.

5. A method according to claim 1 and further comprising discontinuing said call subsequent to said detecting step.

6. A method for conveying information to a computer, the method comprising:

determining the time required for a server to effect a telephone ring signal at said computer by:

tracking elapsed time concurrently at said server and said computer;

initiating a telephone call from said server to said computer after a specified time period has elapsed;

detecting at least one telephone ring signal at said computer;

recording the time at which said telephone ring signal is detected at said computer; and transmitting said recorded time to said server;

notifying said computer of at least one ring-and-delay combination and the information that said combination represents;

initiating a telephone call to said computer;

effecting said ring-and-delay combination using said recorded time at said computer via said telephone call; and detecting said ring-and-delay combination at said computer, thereby conveying said information to said computer.

* * * * *